May 14, 1929.  G. C. DEAKINS  1,713,031

EXPANSIBLE PISTON

Filed Dec. 31, 1924

Inventor.
Grover C. Deakins
Attorney.

Patented May 14, 1929.

1,713,031

UNITED STATES PATENT OFFICE.

GROVER C. DEAKINS, OF ANAHEIM, CALIFORNIA, ASSIGNOR OF ONE-HALF TO ELIHU C. WILSON, OF LOS ANGELES, CALIFORNIA.

EXPANSIBLE PISTON.

Application filed December 31, 1924. Serial No. 759,070.

This invention has to do with pistons of the expansible type; that is, pistons having packing which is capable of being expanded into tight engagement with cylinder walls to compensate for wear that develops by reason of piston reciprocation, especially through liquids in which foreign matter is suspended.

While the piston of my invention is particularly designed for slush pumps used in circulating mud laden fluid during rotary well drilling operations, it may be applied with advantage to any pump wherein the fluid being pumped has abrasive action on the piston.

It is among the objects of the invention to provide a piston of this type which is of comparatively cheap and simple construction; a piston which is easily assembled or taken down for replacement and repair; and one which is fully effective in operation.

I provide a packing ring of elastic material between two rigid members on the piston rod, and by forcing these two members together, considerable end pressure is exerted on the ring from opposite sides thereof. There are passageways in the piston head leading from the cylinder bore to the packing ring, these passageways serving to direct fluid under pressure within the cylinder against the inner peripheral face of the ring. The fluid pressure is thus adapted to expand the ring into tight engagement with the cylinder walls. As the ring wears down, the fluid pressure continuously expands the ring so its tight engagement with the cylinder is maintained.

One of the features of my invention lies in the provision of means for retaining the packing in expanded position when the fluid pressure drops. For instance, suppose the pressure is sufficiently great to have expanded the packing into proper engagement with the cylinder, and then drops such an amount that the resiliency of the packing tends to contract the packing sufficiently to draw it away from the cylinder walls. There would then be an undesirably loose fit between piston and cylinder until the fluid pressure is again raised. By reason of the provisions I make, the ring is held to the position it takes under maximum fluid pressure and the above mentioned objectionable conditions are avoided.

Figure 1:
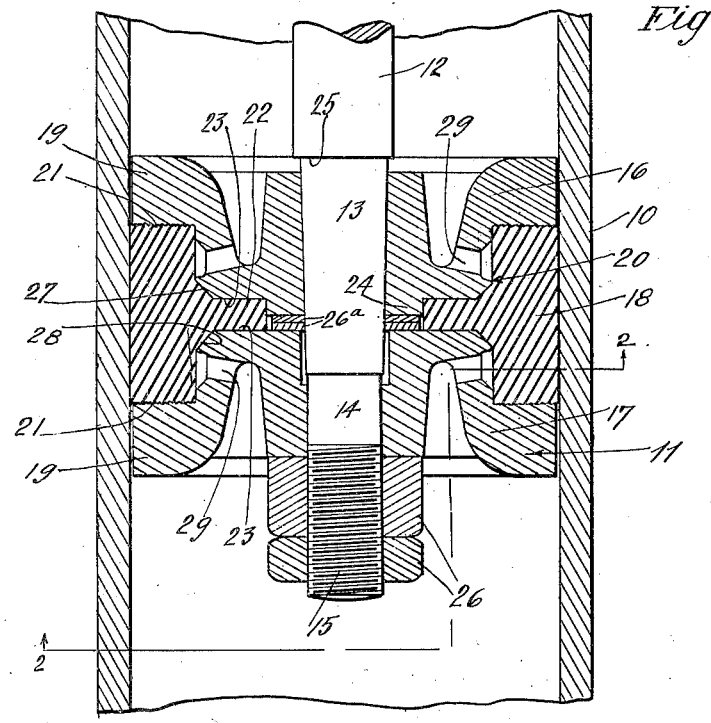
Figure 2:
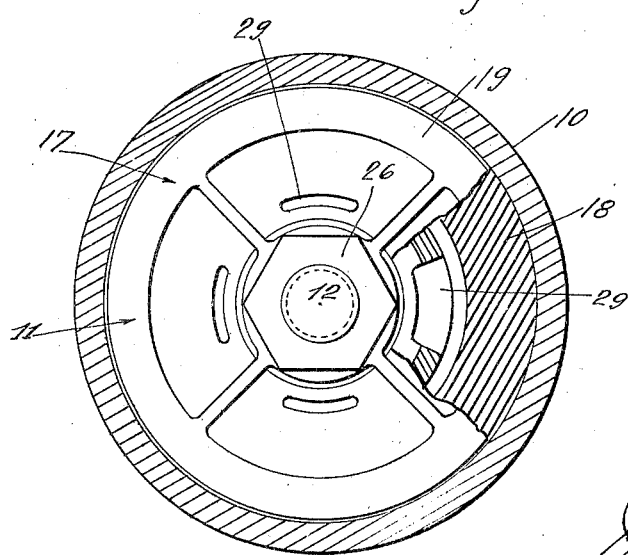

How this is done will be fully set forth in the following detailed specification, wherein other objects and novel features of the invention will be made apparent. Reference will be made to the accompanying drawings, in which:

Fig. 1 is a longitudinal, medial section through a pump piston embodying my invention; and Fig. 2 is a transverse section on line 2—2 of Fig. 1.

In the drawings, numeral 10 designates a pump cylinder through which a piston made up of head 11 on rod 12 is adapted to reciprocate. I will describe piston 11 as being made up in a particular manner and mounted on rod 12 in a certain way, but it will be understood these particularities of construction are not necessary to the invention, considered in its broader aspects, and are not to be considered limitative on the broader claims appended hereto.

Rod 12 has a tapered portion 13 and an extremity 14 of reduced diameter, the latter being threaded at 15 along a portion of its extent.

Head 11 includes two rigid and substantially cylindrical members 16 and 17 mounted on rod 12 in the manner clearly illustrated in Fig. 1, between which is clamped an elastic (rubber, for instance) packing ring 18. Members 16, 17 have peripheral flanges 19 which define the sides of channel 20 when the members are assembled on rod 12. The opposed faces 21 of flanges 19 may be roughened or corrugated to provide for the better gripping of the end faces of ring 18.

Ring 18 has internal flange 22 adapted to extend between the opposed end faces 23 of members 16 and 17, one of the members (16, for instance) preferably having a hub 24 projecting partially into the bore of flange 22.

Movement of member 16 to the right (as viewed in Fig. 1) along rod 12 is limited by the taper 13 of rod 12 or by engagement of said member with rod shoulder 25.

It is evident that by setting up nuts 26 member 17 is moved longitudinally along rod 12 in a manner to compress ring 18 between flanges 19 and to compress flange 22 between faces 23. If desired, spacers or washers 26ª may be interposed between hub 24 and the face 23 of member 17 to limit the movement of the two members towards each other and to avoid undue looseness. Washers 26ª will be provided in varying thicknesses so a proper choice may be made for a given installation.

The described longitudinal compression of ring 18 expands it in diameter and into tight engagement with the walls of cylinder 10. In order to facilitate this expansion and to give the ring uniform diametral expansion throughout, I may provide diagonal surfaces 27 on the two members between their peripheral faces and faces 23; ring 18 having a complementary or fillet formation at 28 between the under face of the ring and the side faces of flange 22. When members 16 and 17 are forced together, faces 27 squeeze the center part of ring 18 outwardly so said center part is expanded substantially equally with the edge parts of the ring.

Members 16 and 17 each have several ports 29 through which liquid pressure from cylinder 12 is directed beneath ring 18. For instance, when the piston travels to the right (as viewed in Fig. 1) the liquid pressure raised to the right of head 11 passes through ports 29 in member 16 and acts against the inner peripheral face of ring 18 at the right hand end thereof, tending to push that end of the ring outwardly and more tightly into engagement with the wall of cylinder 12. During this action, the right hand end or edge of the ring slips outwardly where it bears against the side face of flange 19, and, since the head is compressing the ring longitudinally, there is considerable pressure between said ring edge and flange and the ring will thereby be held in expanded position. Such action occurs when the ring wears, the wear being thus automatically compensated since the liquid pressure expands the ring as fast as wear occurs. Further, it will be seen that even after the pressure drops or is entirely released, the ring is held in the position of expansion it assumed under maximum pressure, by virtue of the continuous exertion of clamping or end pressure set up by nuts 26. The roughening or corrugating of flange faces 21 assist in gripping ring 18 to prevent its contraction after a pressure drop.

Preferably, the normal thickness of flange 22 and the normal size of fillets is such that flange and fillets are put under considerable excess pressure when a packing ring of given width is clamped between flanges 19. Therefore, the center part of ring 18 is expanded practically to the same extent as are its end parts when acted upon by liquid pressure. After the ring wears to a certain extent, the tendency of liquid pressure beneath the end parts of the ring is to expand the ring out of engagement with the peripheral faces of members 16 and 17, flange 22 being drawn radially between faces 23 by such ring movement. The squeezing effect of diagonal faces 27 on fillets 28 aids in thus moving flange 22 outwardly or radially so the center part of the ring does not lag behind the end parts and the entire extent of the peripheral face of the ring is held against the cylinder walls with substantially uniform pressure.

It will be evident that various changes in design, structure and arrangement may be made without departing from the spirit and scope of the invention. For instance, the compression of ring 18 may be brought about by means other than nuts 26, or a member capable of relative movement with respect to member 16 may be utilized for clamping the edge of ring 18. The drawings and description are to be considered merely as illustrative of and not restrictive on the following claims.

Having described a preferred form of my invention, I claim:

1. A piston head adapted to be reciprocated through a cylinder, embodying rigid members having opposed, spaced shoulders, a ring of elastic packing around the head and between the shoulders, an internal flange on the ring, one of said members being movable longitudinally of the head axis towards and away from the other member, means for moving said member to compress the ring between said shoulders and to clamp the flange between the members; there being a passageway in the head leading from the cylinder bore to the underside of the ring whereby fluid under pressure within the cylinder is directed beneath the ring to expand it radially into engagement with the cylinder walls, and the end pressure exerted on the ring by virtue of its compression between said shoulders being adapted to hold the ring in expanded position.

2. A piston adapted to be reciprocated through a cylinder and embodying a piston rod, two substantially cylindrical body members on the rod, each of the members having a peripheral flange which, with the peripheral faces of the members, define a channel about the head when the members are assembled on the piston rod, an elastic packing ring within the channel, an internal flange on the ring and extending between the opposed faces of the members below the channel, and means for forcing the members together on the rod to clamp the ring flange between said faces and to compress the ring within the channel; there being passageways leading from the cylinder bore to the peripheral defining wall of the channel whereby fluid under pressure within the cylinder is admitted to the channel beneath the ring to expand it radially into engagement with the cylinder walls, and the end pressure exerted on the ring by the channel defining walls of the peripheral flanges being adapted to hold the ring in expanded position.

3. A piston structure embodying a head including two cylindrical members mounted on a piston rod, each member having a peripheral flange which, with the peripheral faces of the members, define an annular peripheral channel about the head, an elastic packing ring in the channel, an internal flange on the ring extending inwardly of the ring between the end faces of the members inward of the channel, fillets integral with the ring at the point of internal flange junction therewith, the opposed faces of said members inward of the channel being formed substantially complementary to said fillets, so that upon movement of the member toward each other the said opposed faces act on said fillets to force them and the ring outwardly; and means for forcing the members together on the rod for compressing the ring and its flange longitudinally between them and radially expanding the ring.

4. In a piston head adapted to be reciprocated through a cylinder, a body comprising two parts with opposing peripheral annular shoulders defining an annular channel between them and having opposing faces inward of the channel, an elastic packing ring fitting tightly and compressed axially between the opposed annular shoulders and having a central inwardly extending annular flange clamped between the said opposing surfaces; and the body parts having passages admitting fluid pressure from each end of the piston head to the annular channel under the ring at each side of its flange.

5. In a piston head adapted to be reciprocated through a cylinder, a body comprising two parts with opposing peripheral annular shoulders defining an annular channel between them and having opposing faces inward of the channel, an elastic packing ring in the channel and having an integral elastic inwardly extending annular flange in its central part clamped between the said opposing surfaces; and the body parts having passages admitting fluid pressure from each end of the piston head to the channel under the ring at each side of its flange.

In witness that I claim the foregoing I have hereunto subscribed my name this 25th day of November, 1924.

GROVER C. DEAKINS.